United States Patent
O' Sullivan

(10) Patent No.: US 12,031,800 B2
(45) Date of Patent: Jul. 9, 2024

(54) METHOD OF CONTROLLING SELF-PROPELLED FLYING DEVICES

(71) Applicant: MBDA UK LIMITED, Stevenage (GB)

(72) Inventor: Sean O' Sullivan, Bristol (GB)

(73) Assignee: MBDA UK LIMITED, Stevenage (GB)

( * ) Notice: Subject to any disclaimer, the term of this patent is extended or adjusted under 35 U.S.C. 154(b) by 0 days.

(21) Appl. No.: 17/776,447

(22) PCT Filed: Nov. 5, 2020

(86) PCT No.: PCT/GB2020/052795
§ 371 (c)(1),
(2) Date: May 12, 2022

(87) PCT Pub. No.: WO2021/094711
PCT Pub. Date: May 20, 2021

(65) Prior Publication Data
US 2022/0404122 A1    Dec. 22, 2022

(30) Foreign Application Priority Data
Nov. 15, 2019    (EP) .................................... 19275124
Nov. 15, 2019    (GB) .................................... 1916648

(51) Int. Cl.
*F41G 7/22*    (2006.01)
(52) U.S. Cl.
CPC .......... *F41G 7/2233* (2013.01); *F41G 7/2246* (2013.01)

(58) Field of Classification Search
CPC ............................. F41G 7/2233; F41G 7/2246
See application file for complete search history.

(56) References Cited

U.S. PATENT DOCUMENTS

| | | | |
|---|---|---|---|
| 5,435,503 A * | 7/1995 | Johnson, Jr. .......... | F41G 7/2246 701/3 |
| 9,540,005 B1 | 1/2017 | Howe-Veenstra et al. | |
| 10,323,907 B1 * | 6/2019 | Wright ..................... | F41G 7/36 |
| 11,113,975 B2 | 9/2021 | Pastre et al. | |

(Continued)

FOREIGN PATENT DOCUMENTS

| | | |
|---|---|---|
| EP | 3444566 A1 | 2/2019 |
| EP | 3561626 A1 | 10/2019 |
| WO | 2008039226 A2 | 4/2008 |

OTHER PUBLICATIONS

S. Mobeen and U. I. Bhatti, "Cooperative Guidance Laws for Flight of Multiple UAVs Using Arrival Time Control," 2019 16th International Bhurban Conference on Applied Sciences and Technology (IBCAST), Islamabad, Pakistan, 2019, pp. 431-439, doi: 10.1109/IBCAST.2019.8667129. (Year: 2019).*

(Continued)

*Primary Examiner* — Marcus E Windrich
(74) *Attorney, Agent, or Firm* — Scully, Scott, Murphy & Presser, P.C.

(57) ABSTRACT

A method of controlling a self-propelled flying device that seeks a target. A desired time to reach the target is obtained. The position of the target is acquired. A bias value is calculated, and the flight of the device towards the target is adjusted for a period of time using the bias value. The bias value is calculated so that the device reaches the target at the desired time.

22 Claims, 6 Drawing Sheets

(56) References Cited

U.S. PATENT DOCUMENTS

| | | | | |
|---|---|---|---|---|
| 11,633,596 | B2* | 4/2023 | Schwarz | A61N 1/328 378/65 |
| 2004/0004707 | A1* | 1/2004 | DeFlumere | G01J 1/4228 250/342 |
| 2013/0092785 | A1* | 4/2013 | Tournes | F41G 7/2293 244/3.2 |
| 2016/0343257 | A1 | 11/2016 | Kim | |
| 2022/0111582 | A1* | 4/2022 | Zhang | B33Y 70/00 |
| 2022/0407589 | A1* | 12/2022 | Delaruelle | H04W 76/10 |
| 2023/0058169 | A1* | 2/2023 | Cella | G06N 3/126 |

OTHER PUBLICATIONS

International Preliminary Report on Patentability and Written Opinion dated May 27, 2022 issued in PCT/GB2020/052795.
International Search Report dated Apr. 7, 2021 issued in PCT/GB2020/052795.
GB Search Report dated May 18, 2020 issued in GB1916648.7.
EP Search Report dated Feb. 19, 2020 issued in EP 19275124.6.
Li et al., "Robust Cooperative Guidance Law for Simultaneous Arrival", IEEE Transactions on Control Systems Technology (May 2019), pp. 1-8.
Wei et al., "A Three-Dimensional Cooperative Guidance Law of Multimissile System", International Journal of Aerospace Engineering (Sep. 2015), vol. 2015, Article ID 479427, pp. 1-8.
Zhao et al., "Cooperative Guidance for Multimissile Salvo Attack", Chinese Journal of Aeronautics (2008), vol. 21, pp. 533-539.
Zhao et al., Distributed cooperative guidance for multiple missiles with fixed and switching communication topologies, Chinese Journal of Aeronautics (2017), 30(4), pp. 1570-1581.
Zhao et al., "Three-dimensional cooperative guidance laws against stationary and maneuvering targets", Chinese Journal of Aeronautics, (2015), 28(4), pp. 1104-1120.

* cited by examiner

METHOD OF CONTROLLING SELF-PROPELLED FLYING DEVICES

FIELD OF THE INVENTION

The present invention concerns methods of controlling self-propelled flying devices. More particularly, but not exclusively, the invention concerns controlling a self-propelled flying device that seeks a target so that it reaches the target at a desired arrival time.

BACKGROUND OF THE INVENTION

It can be desirable to control the arrival time at which a self-propelled flying device, such as a missile, reaches its target. A key application is to control the arrival time of multiple missiles, so that they all reach the target at the same time, or at specified intervals, to maximise their effect. However, it can also be desirable to control the arrival time of a single missile or other self-propelled flying device.

While the arrival time can be controlled simply by controlling the time at which a device is launched, unintended effects such as launch positions/time errors, environmental conditions and non-nominal device performance can cause significant inaccuracies in arrival time.

It is common for self-propelled flying devices such as missiles to have a control based upon proportional navigation (PN). PN is a well-known guidance law that is based upon the fact that when a device is on a collision course with a target, the direct line-of-sight of the device to the target does not change direction as the device approaches the target. PN requires that the velocity vector of the device rotates at a rate proportional to, and in the same direction as, the line-of-sight.

Proposed system to control the arrival time of a device that is controlled using PN have been considered, for example in *Cooperative Guidance for Multimissile Salvo Attack*, Zhao S et al, Chinese Journal of Aeronautics, December 2008; Robust Cooperative Guidance Law for Simultaneous Arrival, Li Z et al, IEEE Transactions on Control Systems Technology, May 2019; *Distributed cooperative guidance for multiple missiles with fixed and switching communication topologies*, Zhao Q et al, Chinese Journal of Aeronautics, August 2017; and *Three-dimensional cooperative guidance laws against stationary and maneuvering targets*, Zhao J et al, Chinese Journal of Aeronautics, August 2015. However, the problem is simplified to a two-dimensional system and/or using unrealistic assumptions such as that velocity is constant. Consequently, such proposals cannot be implemented in a real-life system. Another example is in *A Three-Dimensional Cooperative Guidance Law of Multimissile System*, Wei X et al, International Journal of Aerospace Engineering, September 2015, which uses an artificial neural network which is trained using machine learning. However, this solution is complicated, and the training time for the artificial neural network can be slow to obtain acceptable accuracy. A common aspect to all these proposed systems is that the arrival time is varied by adjusting the PN guidance coefficient.

The present invention seeks to solve and/or mitigate some or all of the above-mentioned problems. Alternatively or additionally, the present invention seeks to provide improved methods of controlling a self-propelled flying device and improved methods of controlling a plurality of self-propelled flying devices.

SUMMARY OF THE INVENTION

In accordance with a first aspect of the invention there is provided a method of controlling a self-propelled flying device that seeks a target, the method comprising the steps of:
 obtaining a desired arrival time for the device to reach the target;
 acquiring the position of the target;
 calculating a bias value; and
 adjusting the direction of flight of the device towards the target for a period of time using the bias value;
 wherein the bias value is calculated so that the device reaches the target at the desired arrival time.

By having the flight of the device towards the target adjusted by a bias value, the path of the device to the target is lengthened, as the bias value effectively adds curvature to the path of the missile. The longer path takes the device a greater amount of time to travel. Thus, by selecting an appropriate bias value, the device can be made to reach the target at the desired arrival time.

Advantageously, the flight of the device is controlled by adjusting the rate of change of the device's sightline to the target, and wherein the sightline rate is adjusted by the bias value. A device's sightline rate is adjusted to control its flight in common flight control methods such as proportional navigation. In this case, the bias value can preferably, and advantageously, be applied to the sightline rate. When this is done, rather than flying directly towards the target, the device will fly at an angle away from the direction of the target, where the angle is proportionate to magnitude of the bias value.

Alternatively, the flight of the device towards the target may be adjusted by adjusting the position the device flies towards by the bias value. In other words, rather than the bias value being used to change the angle of flight of the device, instead it is used to change the positon the device flies towards to one distant from the actual target (though this necessarily also changes the angle of flight of the device, of course). It will be appreciated that the bias value could be used to adjust the flight of the device in various other appropriate ways.

Preferably, the device is arranged to seek the target using proportional navigation. Advantageously, the device is arranged to seek the target using generalised explicit guidance (GENEX). GENEX is an extension of PN that allows the angle of impact of the device at arrival to be specified. It is advantageous that the method can also be used when GENEX guidance is used, unlike known methods.

Preferably, the period of time during which the flight of the device towards the target is adjusted by the bias value begins when the devices acquires the position of the target. Alternatively, the period of time may begin before or after the target is acquired.

Preferably, the period of time during which the flight of the device towards the target is adjusted by the bias value ends when the device is a predetermined distance from the target. Alternatively, the period of time during which the flight of the device towards the target is adjusted by the bias value ends a predetermined length of time before the desired time to reach the target. In each case, by stopping using the bias value a certain distance or time before the target is reached, the travel of the device once the bias value is no longer used becomes directly towards the target, and so the target is not missed (or can be reached to within a desired distance) due to the use of the bias value.

Advantageously, the bias value is determined using the Newton-Raphson method.

The device may be a missile. Alternatively, the device may be a drone or any other suitable flying device.

In accordance with a second embodiment of the invention there is provided a method of controlling a plurality of self-propelled flying devices that seek a target, wherein each device of the plurality of devices is controlled using a method as claimed in any preceding claim, the method comprising the steps of:

for each device of the plurality of devices, determining an earliest time the device could reach the target and a latest time the device could reach the target;

determined a desired arrival time for each device of the plurality of devices to reach the target, wherein each desired arrival time is between the earliest time and latest time for the device; and providing each device of the plurality of devices with the desired arrival time to reach the target.

By determining a desired arrival time for each device, a plurality of devices can be coordinated. This is particularity advantageous as the desired arrival time for each device can be determined based on its earliest and latest possible arrival times.

The desired arrival time for each device of the plurality of devices may be the same. Alternatively, desired arrival time for some or all of the devices may be different. This allows, for example, the device arrival times to be staggered at intervals. Where the devices are missiles, this can increase their effect.

Preferably, the earliest time for each device of the plurality of devices is the estimated time to reach the target when no bias value is used.

Preferably, the latest time for each device of the plurality of devices is the estimated time to reach the target when the maximum bias value is used for which the device is able to maintain sight of the target. This gives a latest arrival time which still allows the device to reliably reach the target, as during flight does not lose sight of the target. A device may maintain sight of a target by means of sensors mounted on a gimbal or the like, and so in that case the ability to maintain sight would depend upon the freedom of movement of the gimbal.

Preferably, the maximum bias value is determined using the Newton-Raphson method.

Advantageously, the desired times to reach the target are determined using a Laplacian matrix.

In accordance with a third embodiment of the invention there is provided a self-propelled flying device arranged to seek a target in accordance with any of the methods described above.

The self-propelled flying device may be a missile, or any other suitable flying device.

In accordance with a fourth embodiment of the invention there is provided a computer program product arranged, when executed by a computer processor of a self-propelled flying device, controls the self-propelled flying device to seek a target in accordance with any of the methods described above.

In accordance with a fifth embodiment of the invention there is provided a system comprising a plurality of self-propelled flying devices arranged to seek a target according to any of the methods described above.

Each self-propelled flying device may be a missile, or any other suitable flying device.

It will of course be appreciated that features described in relation to one aspect of the present invention may be incorporated into other aspects of the present invention. For example, the method of the invention may incorporate any of the features described with reference to the apparatus of the invention and vice versa.

DESCRIPTION OF THE DRAWINGS

Embodiments of the present invention will now be described by way of example only with reference to the accompanying schematic drawings of which.

DETAILED DESCRIPTION

Figure 1:
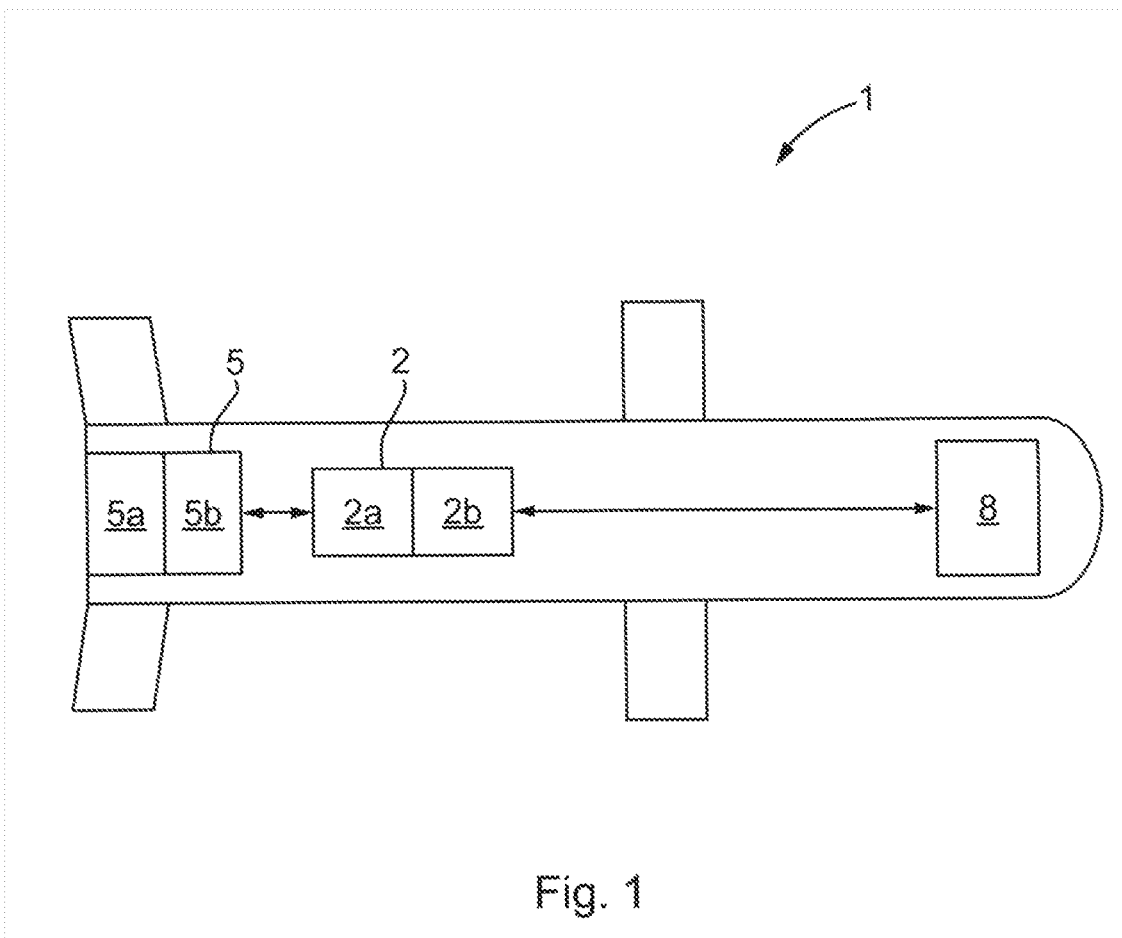
FIG. 1 shows a missile in accordance with a first embodiment of the invention.
Figure 2:
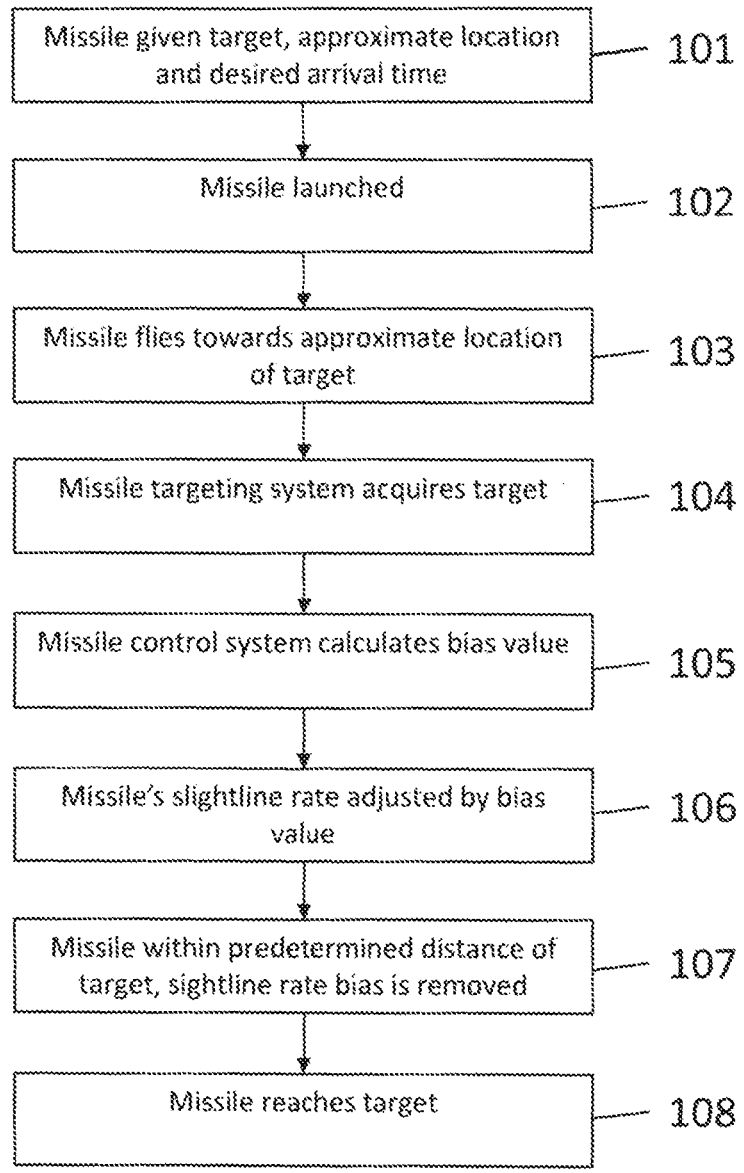
FIG. 2 is a flow chart showing a control method for the missile of FIG. 1.
Figure 3:
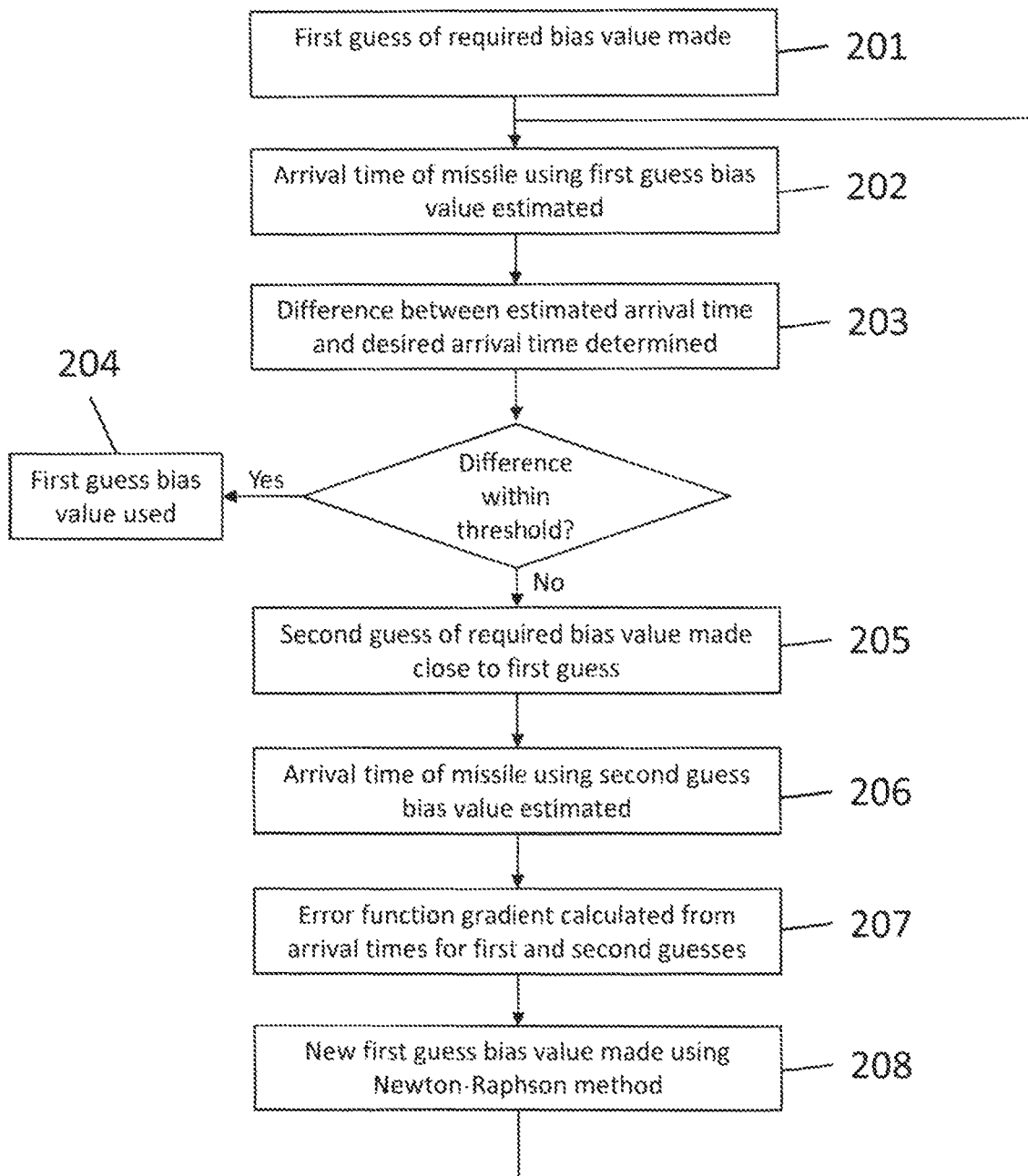
FIG. 3 is a flow chart showing a method of calculating a bias value used by the control method of FIG. 2.

A missile in accordance with a first embodiment of the invention is now described, with reference to FIGS. 1 to 3. The missile 1 comprises a control system 2, which comprises a processor 2a and memory 2b. The control system 2 is in communication with flight system 5 comprising an engine 5a and steering system 5b. The control system 2 is also in communication with a target detection system 8 comprising sensors such as radar. In this way, the control system 2 is able to acquire the position of a target using the target detection system 8, and control the movement of the missile 1 to intercept the target using the flight system 5.

The control of the flight of the missile 1 in accordance with a first embodiment of the invention is now described with reference to the flow chart of FIG. 2. First, the missile 1 is provided with a target, an approximate location of the target, and a desired arrival time to reach the target (step 101). These are provided by the missile system launching the missile 1. The missile 1 is then launched (step 102).

Following launch, the flight system 5 of the missile 1 is initially controlled by the control system 2 to fly towards the approximate location of the target (step 103). The control system 2 implements generalised explicit guidance (GENEX) flight control, which is based upon proportional navigation (PN). The control system 2 uses the approximate location of the target as the target position for the PN.

After a period of time, the target detection system 8 will acquire the target (step 104), i.e. be able to sense it using its sensors and identify its actual position. The control system 2 then calculates a bias value (step 105) that allows the missile 1 to reach the target at the desired time, as described in more detail below. The control system 2 then controls the flight system 2, again using GENEX guidance law, but with the sightline rate measurement of the missile 1 adjusted by the calculated bias value (step 106). This affects the path of the missile 1 towards the target, and so accordingly affects the time it takes the missile 1 to approach the target.

Once the missile 1 is within a predetermined distance of the target, the control system 2 controls the flight system 2 to remove the sightline rate bias (step 107). Once this has occurred the missile 1 then approaches the target by the optimal path, and in due course reaches the target (step 108).

With the method described above, the use of bias value allows the time it takes for the missile 1 to reach the target to be controlled, as effectively the bias value adds curvature to the path of the missile 1 to the target, so increases its length and so the time it takes the missile 1 to travel to the target. By selecting an appropriate bias value, the missile 1 reaches the target at the desired arrival time. However, by stopping using the bias value at a predetermined distance from the target, the missile 1 is able to correct its travel so that it reaches the target, to within a desired distance at least. (If the bias value were maintained, the missile 1 would miss the target, of course.)

The calculation of the bias value in step 105 is now described with reference to the flow chart of FIG. 3. First, the control system 2 of the missile 1 makes a first guess of the required bias value (step 201), and calculates using a fast-flyout model the estimated arrival time of the missile 1 at the target (step 202). A fast-flyout model predicts the trajectory forward in time of the missile 1 to the target, in order to numerically calculate the time of impact. A numerical approach is required (or at least preferable) as the relationship between the properties of the missile's flight to the target and the arrival time of the missile is highly non-linear and therefore extremely difficult to determine analytically.

The difference between the estimated arrival time and the desired arrival time is determined (step 203). If the guessed bias value gives an estimated arrival time within a required threshold of the desired arrival time, the bias value is used as the required bias value (step 204) for the control method shown in FIG. 2.

If the estimated arrival time is not within the required threshold, the control system 2 then makes a second guess of the required bias value close to the first guess (step 205), and again calculates the estimated arrival time of the missile 1 at the target (step 206).

The estimated arrival times for the first and second guesses are then used to calculate the gradient of the error function (step 207), i.e. the function of the difference between the estimated arrival time and the desired arrival time. This estimated gradient can then be used with the well-known Newton-Raphson method to determine a new first guess for the bias value (step 208), and the previous steps (steps 202 onwards) are then repeated using that new guess. As the Newton-Raphson algorithm has quadratic convergence, and it has been shown through testing that the error curve will always be convex and therefore should always successfully converge, a bias value within the required threshold is rapidly obtained.

The control of the flight of a plurality of missiles 1a to 1b in accordance with a second embodiment of the invention is now described with reference to the flow chart of FIG. 4. Each missile 1a to 1b is of the same type as the missile 1 of FIG. 1.

Similarly to the first embodiment, first the missiles 1a to 1b are provided with a target and an approximate location for the target (step 301). However, the missiles 1a to 1d are not given a desired arrival time. The missiles 1a to 1d are then launched (step 302). Following launch, the missiles 1a to 1d are initially controlled fly towards the approximate location of the target (step 303). After a period of time, the target detection system of each missile 1a to 1d will acquire the target (step 304).

Each missile 1a to 1d then calculates an earliest time it could reach the target and a latest time it could reach the target (step 305). The earliest time is determined as the time it would take a missile to reach the target with no bias value being used. The latest time is determined as the time it would take a missile to reach the target if the maximum possible bias value was used.

The maximum possible bias value is the greatest bias value that still allows the target to be seen by the targeting system of a missile. When a bias value is used, this causes the missile to be angled away from the target. The sensors of the targeting system are generally mounted on a gimbal, allowing them a degree of freedom of movement to be pointed in a direction away from the direction of flight of the missile. Thus, the maximum bias value will depend on the freedom of movement of the gimbal. The maximum bias value can again be calculated iteratively using the Newton-Raphson method, but in this case with the error function being defined as the difference between the maximum look angle on the estimated path of travel (i.e. the angle between the direction of travel of the missile and direction of the target) and the gimbal limit angle of the targeting system (i.e. the freedom of movement of the gimbal).

Each of the missiles 1a to 1d then shares its earliest and latest possible arrival times with the other missiles (step 306). The missiles 1a to 1d then select between them a desired arrival time to reach the target (step 307) from amongst the shared earliest and latest possible arrival times, as described in more detail below. The desired arrival time is between the earliest time and latest time for each of the missiles 1a to 1d. Each of the missiles 1a to 1d then uses this desired arrival time with the method of the first embodiment described above (step 308), so that each of the missiles 1a to 1d arrives at the target at the same time (step 309), namely the selected desired arrival time.

During flight the steps 305 to 308 can be repeated, as shown by the line looping from step 308 back to step 306, so that if there are any unexpected changes in the system, for example environmental conditions affecting possible arrival times, each of the missiles 1a to 1d can recalculate its earliest and latest possible arrival times and these used to select a new desired arrival time for each of the missiles 1a to 1d to use.

Figure 5:
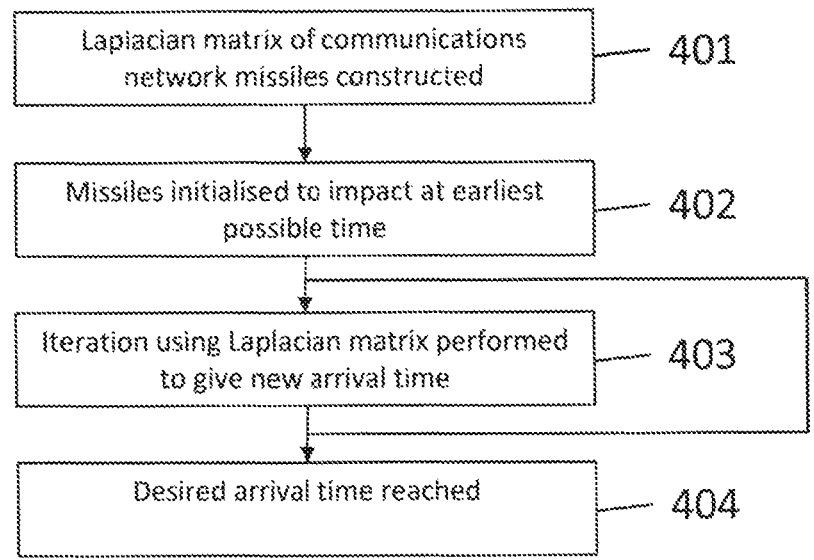
FIG. 5 is a flow chart showing a method of selecting an arrival time used by the control method of FIG. 2.

The selection of the desired arrival time in step 307 is now described with reference to the flow chart of FIG. 5. First, a Laplacian matrix L is constructed that describes the topology of the communications network between the missiles 1a to 1d (step 401). The Laplacian matrix L is constructed from an adjacency matrix A, for which each row corresponds to one of the missiles 1a to 1d, similarly each column corresponds to one of the missiles 1a to 1d. The adjacency matrix A is formulated by placing a 1 in the matrix entry where the missile in column j receives a message from the missile in row i. A degree matrix D is then constructed from the adjacency matrix A. The degree matrix D is a diagonal matrix (i.e. it has zeros everywhere except on its diagonal), and each diagonal corresponds to the sum of the entries in the corresponding row of the adjacency matrix A. The Laplacian matrix is then the adjacency matrix A *minus* the degree matrix D. So for example, in a system of three missiles, in which the first and second missiles can send messages to each other, the third missile can send messages to the second missile, and no other sending of missiles is possible, the three matrices will be as follows:

$$A = \begin{bmatrix} 0 & 1 & 0 \\ 1 & 0 & 1 \\ 0 & 0 & 0 \end{bmatrix} \Rightarrow D = \begin{bmatrix} 1 & & \\ & 2 & \\ & & 0 \end{bmatrix} \Rightarrow L = \begin{bmatrix} 1 & -1 & 0 \\ -1 & 2 & -1 \\ 0 & 0 & 0 \end{bmatrix}$$

The Laplacian matrix L is then used to calculate a new desired arrival time for each of the missiles $1a$ to $1d$ as follows, using the following equation:

$$\vec{T}_{k+1}=(I_n-CL)\vec{T}_k,$$

where $\vec{T}_x$ is a column vector of $t_{des}^i$ values at the $x^{th}$ iteration, $I_n$ is the [n×n] identity matrix, n is the number of missiles in the system, and C is the gain matrix with all off-diagonal terms equal to 0.

First, each of the missiles $1a$ to $1d$ is initialised with an arrival time equal to its earliest arrival time (step 402), i.e. with no bias value used at all. This is done by setting the initial $t_{des}^i$ value for each of the missiles $1a$ to $1d$ to be equal to its earliest arrival time $t_{min}^i$.

The equation above is then iterated (step 403), to give a new arrival time for each of the missiles $1a$ to $1d$. The iteration is repeated until the desired arrival time for each of the missiles $1a$ to $1d$ is reached (step 404).

The desired arrival time for each of the missiles $1a$ to $1d$ is (if possible) a common arrival time, i.e. the same for each of the missiles $1a$ to $1d$. By setting the initial $t_{des}^i$ value for each of the missiles $1a$ to $1d$ to be equal to its earliest arrival time $t_{min}^i$, there is convergence of $t_{des}^i$ at the latest $t_{min}^i$ time. This results in the selected impact time being the earliest possible time, with each of the missiles $1a$ to $1d$ taking the shortest possible path which allows for synchronised arrival. This maintains as much speed as possible in the arrival phase, minimising miss distance and maximising the effect of the missiles $1a$ to $1d$.

If there is no common overlap between admissible arrival times, i.e. the same arrival time for each of the missiles $1a$ to $1d$ is not possible, the system will nevertheless aim to reduce the overall error (i.e. difference) in arrival times. For example, in a system with three missiles and earliest and latest arrival times as follows, missile A and missile C have no possible overlap.

| Missile | Earliest arrival time | Latest arrival time |
|---------|----------------------|---------------------|
| A | 40 | 60 |
| B | 50 | 80 |
| C | 70 | 100 |

In this case, the arrival time for missile A will converge upon 60 (the latest possible), the arrival time for missile C will converge upon 70 (the earliest possible), and the arrival time for missile B will converge upon 65 (partway between the arrival times of the others, to minimize the overall error).

The Laplacian matrix can be used to determine offset arrival times. In other words, instead of requiring all missiles to hit simultaneously, a defined interval between the impact times of each missile can be specified. To achieve this, the following equation is used:

$$\vec{T}_{k=1}=\vec{T}_k-CL\{\vec{T}_k-\vec{t}_{offset}\},$$

where $\vec{t}_{offset}$ is a column vector defining the inter-missile impact time offsets. For example, using a four-missile system with a one-second offset between arrival times, $\vec{t}_{offset}$ is as follows:

$$\vec{t}_{offset}=[0\ 1\ 2\ 3]'$$

When this is done, the values of $t_{des}^i$ converge to required values.

Figure 4:
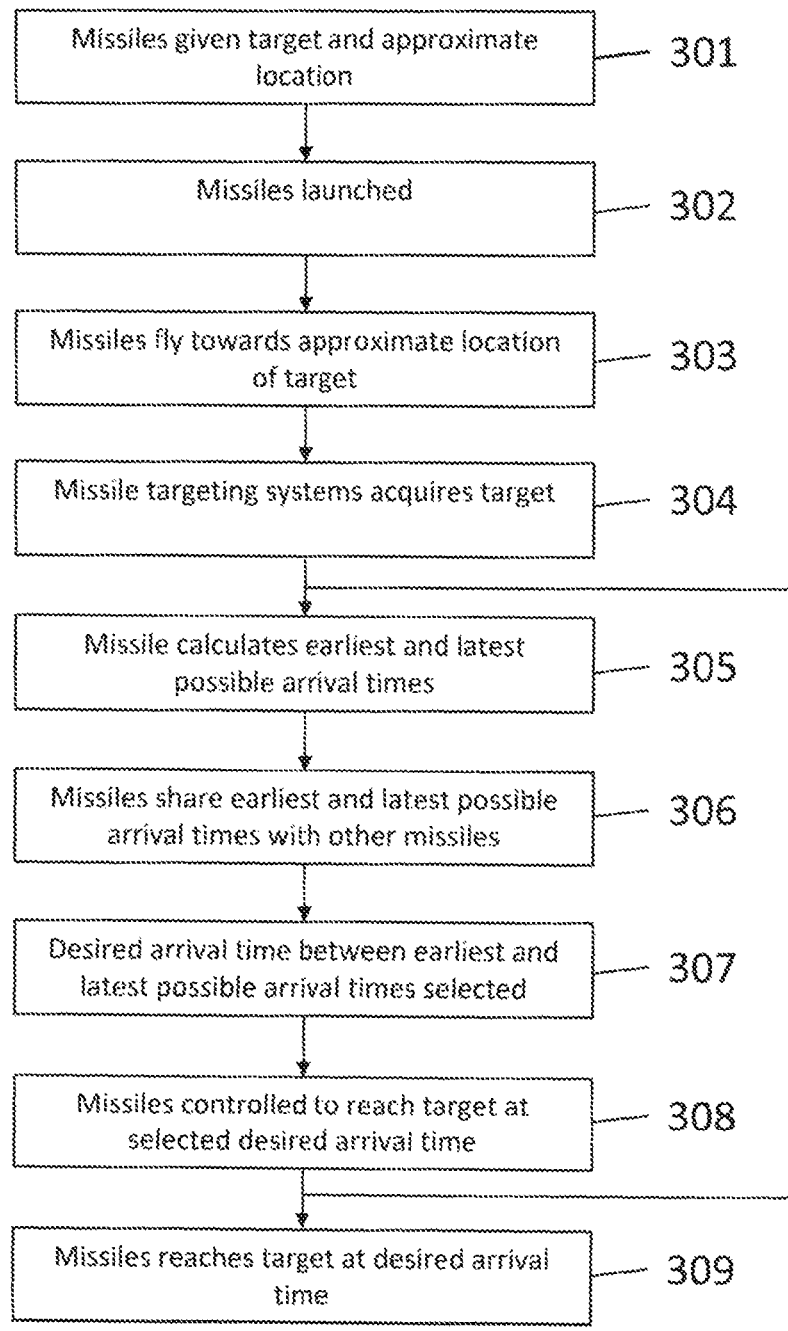
FIG. 4 is a flow chart showing a control method in accordance with a second embodiment of the invention.
Figure 6:
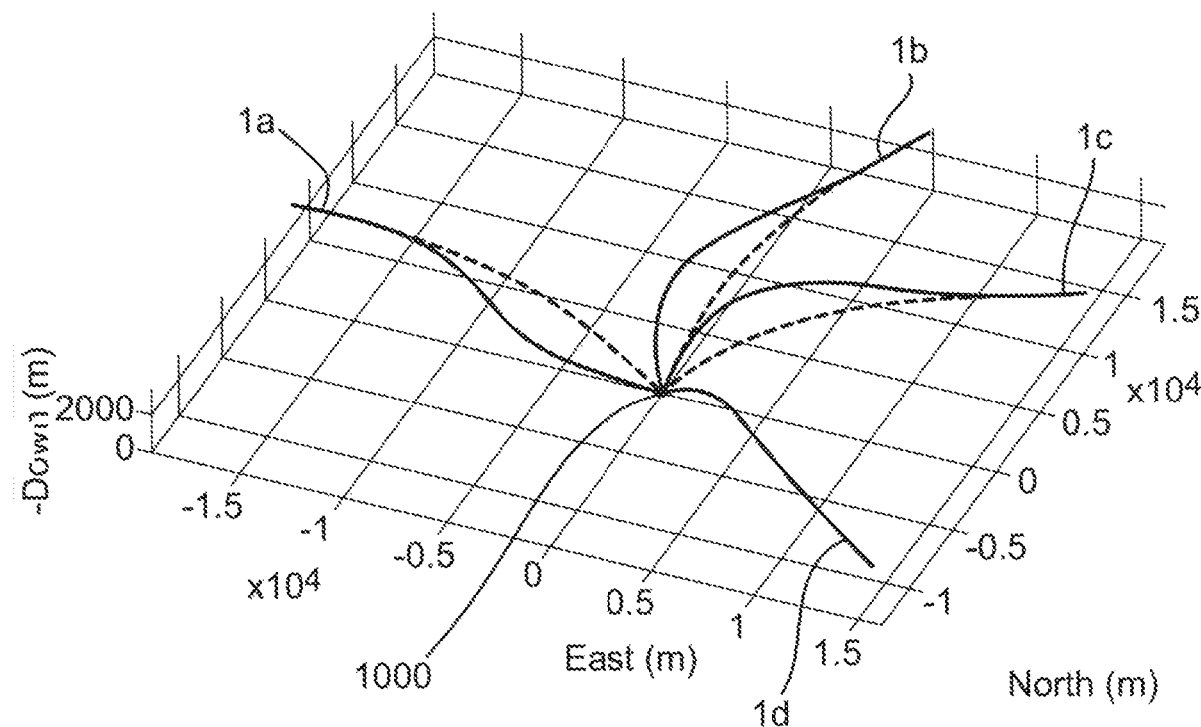
FIG. 6 shows a simulation of the flight of missiles accordance with the control method of FIG. 4.

A simulation showing the flight of the missiles $1a$ to $1d$ to a target 1000 in accordance with the control method of FIG. 4 is shown in FIG. 6. The dotted lines show the flight of the missiles $1a$ to $1d$ if no bias values were used, and the solid lines show the flight of the missiles $1a$ to $1d$ using bias values. As can be seen, the use of the bias values causes an increased curve in the paths of the missiles $1a$ to $1d$, so increases the time each takes to reach the target 1000. It can also be seen that, once the missiles $1a$ to $1d$ are within a certain distance of the target 1000, their paths change to be directly towards the target 1000, i.e. without any bias value. Thus, it can be seen that the selection of appropriate bias values for each of the missiles $1a$ to $1d$ allows the time they reach the target 1000 to be synchronised. In addition, stopping using the bias values within a certain distance of the target 1000, each of the missiles $1a$ to $1d$ does in fact reach the target 1000, and is not caused by the bias value to miss.

While the present invention has been described and illustrated with reference to particular embodiments, it will be appreciated by those of ordinary skill in the art that the invention lends itself to many different variations not specifically illustrated herein. By way of example only, certain possible variations will now be described.

Rather than adjusting the device's sightline to the target by the bias value, instead the positon towards which the device is flying could be adjusted by the bias value, i.e. to make the device fly towards a positon distant from the target by the bias value. It will be appreciated that the bias value could be used to adjust the flight of the device in various other appropriate ways.

When estimating the arrival time for a device for a particular the bias value, in order to determine the required bias value, it can be assumed that a device will stop using the bias value at a predetermined distance from the target. Alternatively it can be assumed that a device will stop using the bias value at a predetermined time from reaching the target. When using the bias value in actual flight, the device can stop using the bias value at the predetermined distance or time respectively. However, it will be appreciated that the stopping using the bias value could be handled in various other ways that would still be in accordance with the invention. Whichever way was used, including using a predetermined distance or time, the device could calculate in flight an appropriate point at which to stop using the bias value so as to reach the target at the desired time. This allows unintended conditions during flight to be compensated for, for example unexpectedly fast or slow travel to the target due to the effect of environmental conditions.

While the estimation of the arrival time has been disclosed as being done used a fast-flyout model, any other suitable method could be used, for example an offline-trained artificial neural network.

Where there are multiple devices, rather than all devices having the same desired arrival time, different devices could have different desired arrival times. For example, the desired arrival times could be staggered at specified intervals. The desired arrival time for a device would be between the earliest and latest arrival time for that device, of course, and could be between the earliest and latest arrival times for all or some of the devices.

The earliest and latest arrival times for a device could be determined when it has acquired the target, or only once some or all devices had acquired the target. Similarly, the desired arrival times for the devices could be determined only once all devices had acquired the target, or after a certain number had or after a certain amount of time, so that the failure of one or more devices to acquire the target did not prevent the method being used.

The device or devices could be any other appropriate flying device other than a missile, for example a drone.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. A method of controlling a self-propelled flying device that seeks a target, the method comprising the steps of:
    obtaining a desired arrival time for the self-propelled flying device to reach the target, the desired arrival time being set prior to launch;
    acquiring a position of the target;
    determining a bias value based on the desired arrival time and the position; and
    adjusting a direction of flight of the self-propelled flying device towards the target for a period of time using the bias value,
    wherein the bias value is calculated so that the self-propelled flying device reaches the target at the desired arrival time, and
    wherein the determining comprises:
        providing an initial candidate for the bias value;
        estimating an arrival time at the target using the initial candidate as the bias value;
        determining a difference between the estimated arrival time and the desired arrival time; and
        setting the initial candidate as the bias value when the difference is less than a threshold, otherwise, repeating the estimating the arrival time with a new candidate for the bias value and determining the bias value using a Newton-Raphson method.

2. The method as claimed in claim 1, wherein the flight of the self-propelled flying device is controlled by adjusting a rate of change of the device's sightline to the target, and wherein the sightline rate is adjusted by the bias value.

3. The method as claimed in claim 1, wherein the flight of the self-propelled flying device towards the target is adjusted by adjusting the position the self-propelled flying device flies towards by the bias value.

4. The method as claimed in claim 1, wherein the self-propelled flying device is arranged to seek the target using proportional navigation.

5. The method as claimed in claim 4, wherein the self-propelled flying device is arranged to seek the target using generalised explicit guidance (GENEX).

6. The method as claimed in claim 1, wherein the period of time during which the flight of the self-propelled flying device towards the target is adjusted by the bias value begins when the self-propelled flying device acquires the position of the target.

7. The method as claimed in claim 1, wherein the period of time during which the flight of the self-propelled flying device towards the target is adjusted by the bias value ends when the self-propelled flying device is a predetermined distance from the target.

8. The method as claimed in claim 1, wherein the period of time during which the flight of the self-propelled flying device towards the target is adjusted by the bias value ends a predetermined length of time before the desired arrival time to reach the target.

9. The method as claimed in claim 1, wherein the self-propelled flying device is a missile.

10. A method of controlling a plurality of self-propelled flying devices that seek a target, the method comprising the steps of:
    for each self-propelled flying device of the plurality of self-propelled flying devices,
    acquiring a position of a target after the self-propelled flying device is launched;
    determining an earliest time the self-propelled flying device could reach the target and a latest time the self-propelled flying device could reach the target, wherein the earliest time for a self-propelled flying device is an estimated time to reach the target when no bias value is used for the self-propelled flying device and wherein the latest time for a self-propelled flying device is the estimated time to reach the target when a maximum bias value is used, for which maximum bias value the self-propelled flying device is able to maintain sight of the target, and where the maximum bias value is also based on a freedom of movement of the self-propelled flying device;
    transmitting the determined earliest time and the determined latest time to the other self-propelled flying devices and receiving the determined earliest time and the determined latest time from the other self-propelled flying devices;
    determining a desired arrival time for the device to reach the target, wherein the desired arrival time is between the earliest possible arrival time and latest possible arrival time among the self-propelled flying devices;
    determining a bias value based on the desired arrival time and the position of the target; and
    adjusting the direction of flight of the self-propelled flying device towards the target for a period of time using the bias value
    wherein each respective bias value is determined such that each of the self-propelled flying devices reaches the target at the respective desired arrival time.

11. The method as claimed in claim 10, wherein the desired arrival time for each self-propelled flying device of the plurality of self-propelled flying devices is the same.

12. The method as claimed in claim 10, wherein the determining of each bias value comprises:
    providing an initial candidate for the bias value;
    estimating an arrival time at the target using the initial candidate as the bias value;
    determining the difference between the estimated arrival time and the desired arrival time;
    setting the initial candidate as the bias value when the difference is less than a threshold, otherwise, repeating the estimating the arrival time with a new candidate for the bias value and determining the bias value using the Newton-Raphson method.

13. The method as claimed in claim 10, wherein the desired arrival times to reach the target are determined using a Laplacian matrix.

14. A self-propelled flying device arranged to seek a target in accordance with the method of claim 1.

15. The self-propelled flying device as claimed in claim 14, wherein the self-propelled flying device is a missile.

16. One or more computer program products arranged, when executed by a computer processor of each of a plurality of self-propelled flying devices, to control each of the plurality of the self-propelled flying devices to seek a target by executing the method in claim 10.

17. A system comprising a plurality of self-propelled flying devices arranged to seek a target according to the method in claim 10.

18. The system as claimed in claim 17, wherein each self-propelled flying device of the plurality of self-propelled flying devices is a missile.

19. The method as claimed in claim 10, wherein the determining an earliest time the self-propelled flying device could reach the target and a latest time the self-propelled flying device could reach the target, the transmitting and receiving, the determining a desired arrival time and the determining a bias value are repeated.

20. The method as claimed in claim 10, wherein each self-propelled flying device receives the target and an approximate location of the target prior to launch.

21. The method as claimed in claim 10, wherein the determining the desired arrival time comprising determining whether there is a common overlap in the arrival time for all of the self-propelled flying devices based on the received determined earliest time and the determined latest time and wherein when there is a common overlap, each desired arrival time is set to be within the common overlap and wherein where there is at least one self-propelled flying device without a common overlap, the desired arrival time for each of the at least one self-propelled flying device is set to either the earliest time or the latest time.

22. The method as claimed in claim 10, wherein determining the desired arrival time comprising applying a preset timing offset such that there is a defined interval between an impact time for each self-propelled flying device.

* * * * *